(No Model.)
E. L. RANSOME.
BUILDING CONSTRUCTION.
No. 305,226. Patented Sept. 16, 1884.
FIG. 1.
FIG. 2.
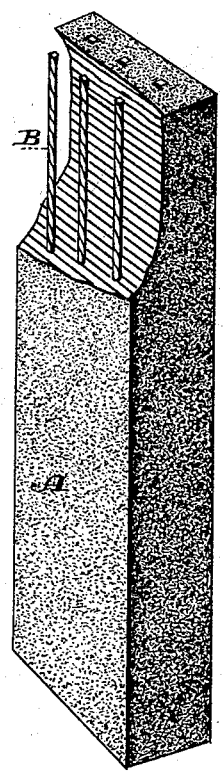
Witnesses,
Geo. H. Strong.
J. H. Rouse.
Inventor,
E. L. Ransome
By Dewey & Co.
Attorneys

UNITED STATES PATENT OFFICE.

ERNEST L. RANSOME, OF SAN FRANCISCO, CALIFORNIA.

BUILDING CONSTRUCTION.

SPECIFICATION forming part of Letters Patent No. 305,226, dated September 16, 1884.

Application filed May 1, 1884. (No model.)

*To all whom it may concern:*

Be it known that I, ERNEST L. RANSOME, of the city and county of San Francisco, and State of California, have invented an Improvement in Building Construction; and I hereby declare the following to be a full, clear, and exact description thereof.

My invention relates to the strengthening of concrete, artificial stone, or similar material or substance of which structures are formed by the use of iron.

In the use of concrete, artificial stone, brick and mortar, or cement, either wholly or in part, the tensional strain or tendency to break transversely has sometimes been resisted by straight iron rods extending through the substance and having nuts and washers upon the ends. If any strain sufficient to deflect the structure is placed upon it, the rods will stretch and draw, so as to allow the material to crack or break.

My invention consists in a means for strengthening the structure by the use of rods or strips of iron, steel, or other suitable metal, which extend through the material and are twisted, so that they are fixed within the material at every point from end to end, and a rigid bond is thus formed throughout the entire length, the tendency of the iron to stretch or draw being resisted at every point in its length.

Referring to the accompanying drawings for a more complete explanation of my invention, Figure 1 is a view of a structure partially in section, showing my invention. Fig. 2 shows the spiral rod.

A is a structure, which may be formed of concrete, artificial stone, or any material which becomes solid from the plastic state in which it is first formed. When there is any strain upon the structure, there will be a tendency to deflect it, and the tensional strain thus brought upon it may reach the point of rupture. If straight rods or ribbons extend through the structure they will only resist a strain until they have become stretched by the tensions upon them, after which they afford only partial or inadequate support to the structure. In the same manner, if the rods should become broken at any point, their even size would allow them to slip within the structure, and thus they would afford little or no support.

In my invention the rods or strips B are twisted, and by their spiral shape they form a bond or tie at all points from end to end within the material through which they pass.

It will be seen that the principal advantage arises from the bond, which is formed at every point throughout the material by the peculiar shape of the rods or strips.

It will be manifest that other means—such as rods with alternately large and small sections or other similar constructions—may be used; but that first described appears better fitted for the purpose on account of the continuous bond which it forms.

Having thus described my invention, what I claim as new, and desire to secure by Letters Patent, is—

1. The means for strengthening structures of concrete, artificial stone, or similar material, consisting of rods or bars placed within the material twisted, as herein described.

2. In a structure formed of concrete, artificial stone, or with mortar or cement, wholly or in part, rods or bars extending through the mass and twisted or formed so as to create a continual bond, as herein described.

In witness whereof I have hereunto set my hand.

ERNEST L. RANSOME.

Witnesses:
S. H. NOURSE,
C. D. COLE.